United States Patent
Herden et al.

(12) 
(10) Patent No.: US 8,355,415 B2
(45) Date of Patent: Jan. 15, 2013

(54) METHOD FOR OPERATING AN IGNITION DEVICE, AND AN IGNITION DEVICE

(75) Inventors: Werner Herden, Gerlingen (DE); Manfred Vogel, Ditzingen (DE); Heiko Ridderbusch, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 363 days.

(21) Appl. No.: 12/301,865

(22) PCT Filed: Jun. 4, 2007

(86) PCT No.: PCT/EP2007/055447
§ 371 (c)(1),
(2), (4) Date: Aug. 3, 2010

(87) PCT Pub. No.: WO2008/000585
PCT Pub. Date: Jan. 3, 2008

(65) Prior Publication Data
US 2010/0296530 A1 Nov. 25, 2010

(30) Foreign Application Priority Data
Jun. 29, 2006 (DE) .................. 10 2006 029 996

(51) Int. Cl.
*H01S 3/11* (2006.01)

(52) U.S. Cl. ........... 372/10; 372/70; 372/71; 123/143 B; 123/143 R

(58) Field of Classification Search .................... 372/10, 372/70, 71; 123/143 B, 143 R
See application file for complete search history.

(56) References Cited

U.S. PATENT DOCUMENTS

| | | | |
|---|---|---|---|
| 6,514,069 B1 * | 2/2003 | Early et al. | 431/1 |
| 6,676,402 B1 * | 1/2004 | Early et al. | 431/1 |
| 6,796,278 B2 * | 9/2004 | Ryan, III | 123/143 B |
| 7,421,166 B1 * | 9/2008 | Woodruff et al. | 385/39 |
| 2006/0120418 A1 * | 6/2006 | Harter et al. | 372/30 |
| 2006/0159132 A1 * | 7/2006 | Young et al. | 372/10 |

FOREIGN PATENT DOCUMENTS

| | | |
|---|---|---|
| JP | 5-327103 | 12/1993 |
| JP | 2000-298200 | 10/2000 |
| JP | 2006-153985 | 6/2006 |
| JP | 2006144618 A * | 6/2006 |

* cited by examiner

*Primary Examiner* — Yuanda Zhang
(74) *Attorney, Agent, or Firm* — Kenyon & Kenyon LLP

(57) ABSTRACT

In a method for operating an ignition device for an internal combustion engine, in particular of a motor vehicle, having a laser device which includes a laser-active solid having a passive Q-switching system as well as an optical amplifier connected downstream from the passive Q-switching system (46), the laser device generates a laser pulse for radiating into a combustion chamber, and the ignition device having a pump light source which provides a pump light for the laser-active solid and the optical amplifier (70) of the laser device. The energy of the laser pulse is controlled by varying a wavelength of the pump light.

11 Claims, 2 Drawing Sheets

METHOD FOR OPERATING AN IGNITION DEVICE, AND AN IGNITION DEVICE

FIELD OF THE INVENTION

The present invention relates to a method for operating an ignition device for an internal combustion engine, in particular of a motor vehicle, having a laser device which includes a laser-active solid having a passive Q-switching system as well as an optical amplifier connected downstream from the passive Q-switching system, the laser device generating a laser pulse for radiating into a combustion chamber, and the ignition device having a pump light source which provides a pump light for the laser-active solid and the optical amplifier of the laser device.

The present invention also relates to an ignition device of this type.

BACKGROUND INFORMATION

The operating method stated above, or the corresponding ignition device, is known and is used, in particular, in laser-based ignition systems of internal combustion engines in the automotive sector. However, the known ignition devices having a passive Q-switching system are unable to generate laser pulses of variable output energy, in particular when using a single pump light source. An ignition device including a laser is known from DE 199 11 737.

SUMMARY

Example embodiments of the present invention provide an operating method of the type stated above and a corresponding ignition device such that it may be operated more flexibly and, in particular, is designed to emit laser pulses of variable output energy.

According to example embodiments of the present invention, an operating method of the type stated above includes controlling the energy of the laser pulse by varying a wavelength of the pump light.

Due to the variation in the wavelength of the pump light, the absorption length in the laser-active solid or in the optical amplifier varies accordingly. This means that, due to correspondingly varied absorption ratios, the pump light emits different amounts of energy to the laser-active solid or to the optical amplifier at different wavelengths of the pump light, which results in the buildup of a population inversion in a manner which is known per se.

However, a variation produced in this manner in the amount of pump light energy supplied to the laser-active solid of the passively Q-switched oscillator does not affect the energy of a laser pulse formed therein. The energy of the laser pulse formed in the laser-active solid is substantially determined solely by the selection of the solid material, the characteristics of the passive Q-switching system, an output coupling mirror and a volume of the laser-active solid to which pump light is applied. These parameters are generally fixed for structural reasons, and therefore are not dynamically variable.

However, an amount of pump light energy which is varied by the variation of the pump light wavelength and is supplied to the optical amplifier affects the degree of the population inversion formed in the optical amplifier so that the laser pulse formed in the oscillator of the laser-active solid may be advantageously amplified by a different amount—as a function of the pump light wavelength—before the pulse is radiated into the combustion chamber by the laser device. The degree of optical amplification by the optical amplifier therefore is directly dependent on the wavelength of the pump light used, as well as on the energy of the correspondingly amplified laser pulse.

Further features, possible applications and advantages of example embodiments of the present invention are described in the following description and in the figures.

DETAILED DESCRIPTION

Figure 1:
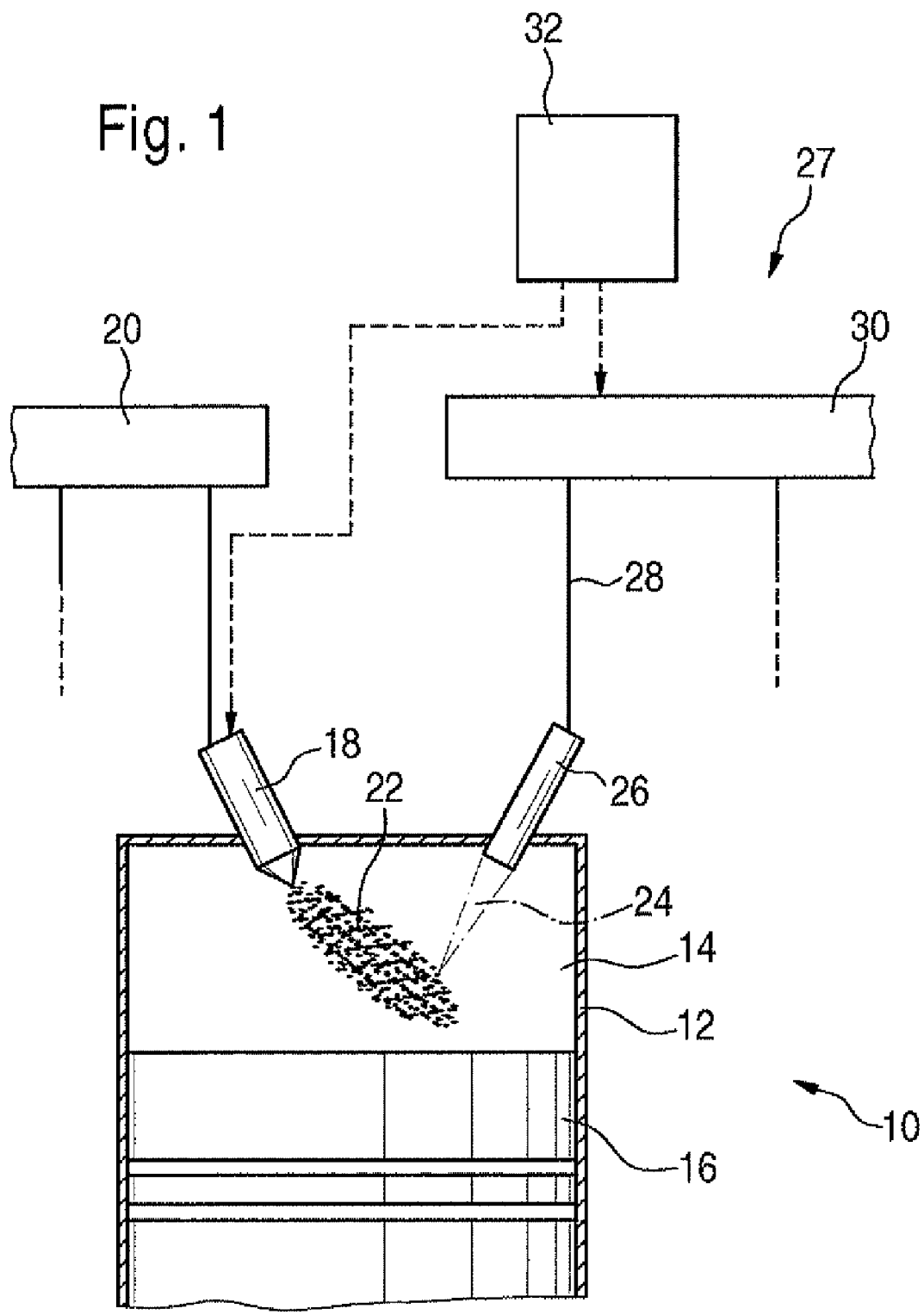
FIG. 1 shows a schematic representation of an internal combustion engine having an ignition device according to an example embodiment of the present invention.

In FIG. 1, an internal combustion engine is identified as a whole by reference numeral 10. The internal combustion engine is used to drive a motor vehicle. Internal combustion engine 10 includes multiple cylinders, only one of which is identified by reference numeral 12 in FIG. 1. A combustion chamber 14 of cylinder 12 is limited by a piston 16. Fuel enters combustion chamber 14 directly via an injector 18, which is connected to a fuel pressure accumulator 20, which is also referred to as a rail or a common rail.

Fuel 22 injected into combustion chamber 14 is ignited by a laser pulse 24, which is radiated into combustion chamber 14 by an ignition device 27 including a laser device 26. For this purpose, laser device 26 is supplied with a pump light via an optical waveguide device 28, the pump light being provided by a pump light source 30. Pump light source 30 is controlled by a control and regulating device 32, which also activates injector 18.

For example, pump light source 30 may be a semiconductor laser diode which emits a corresponding pump light to laser device 26 via optical waveguide device 28 as a function of a control current. Although semiconductor laser diodes and other compact pump light sources are preferred for use in the automotive sector, any type of pump light source in which the wavelength of the pump light is adjustable may, in principle, be used for operating ignition device 27.

Figure 2:
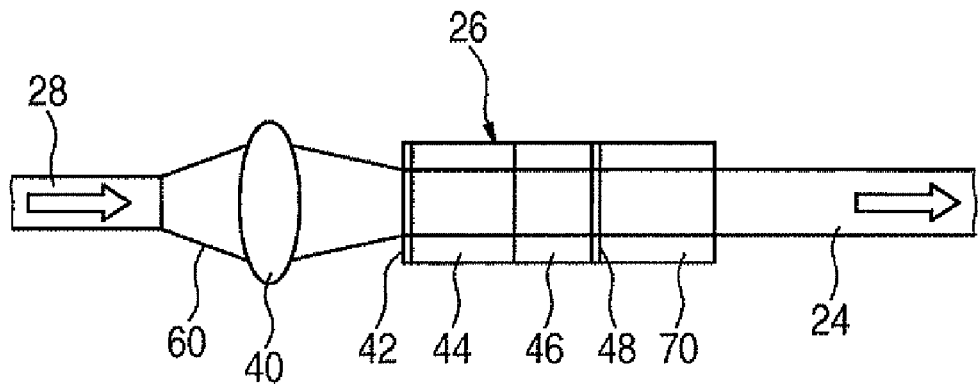
FIG. 2 shows a detail of the ignition device according to an example embodiment of the present invention.

FIG. 2 shows a schematic representation of a detailed view of laser device 26 from FIG. 1.

As shown in FIG. 2, laser device 26 includes a laser-active solid 44, optically downstream from which a passive Q-switching system 46, also referred to as a Q-switch, is situated. In this case, laser active solid 44, together with passive Q-switching system 46 as well as input coupling mirror 42 located on the left side thereof in FIG. 2 and output coupling mirror 48, forms a laser oscillator whose oscillation response depends on passive Q-switching system 46 and is thus controllable at least indirectly in a manner which is known per se.

In the configuration of laser device 26 illustrated in FIG. 2, pump light 60 is directed by optical waveguide device 28 described above with reference to FIG. 1 from pump light source 30, which is also described above, onto an existing input coupling objective symbolized by a bi-convex lens 40, which focuses pump light 60 onto input coupling mirror 42. Since input coupling mirror 42 is permeable to the wavelengths of pump light 60, pump light 60 penetrates laser-active solid 44 and produces a population inversion therein, which is known per se.

While passive Q-switching system 46 is in its idle state, in which it has a relatively low transmission coefficient, operation of the laser in laser-active solid 44 or in solid 44, 46 limited by input coupling mirror 42 and output coupling mirror 48 is avoided. As the pumping duration increases, however, the radiation intensity in laser oscillator 42, 44, 46, 48 also increases so that passive Q-switching system 46 fades, i.e., its transmission coefficient increases, and laser operation begins in laser oscillator 42, 44, 46, 48.

This produces a laser pulse 24, which is also referred to as a giant pulse and which has a relatively high peak power. If necessary, laser pulse 24 is coupled into combustion chamber 14 (FIG. 1) of internal combustion engine 10, using a further optical waveguide device or directly through a combustion chamber window of laser device 26, so that fuel 22 present therein is ignited.

In the ignition device, the laser pulse formed in laser-active solid 44 is also optically amplified by downstream optical amplifier 70 before laser pulse 24 is radiated into combustion chamber 14. In the same manner as for laser-active solid 44, optical amplifier 70 is pumped by pump light 60 of pump light source 30, so that a population inversion which may be used to amplify a laser pulse also builds up in optical amplifier 70 as soon as passive Q-switching system 46 allows the laser to be operated in laser oscillator 42, 44, 46, 48 and thus allows a laser pulse to be generated. In the configuration according to FIG. 2, optical amplifier 70 is pumped by pump light 60 which previously passed through components 44, 46.

In the method for operating ignition device 27, it is particularly advantageous to vary a wavelength of utilized pump light 60 to control the energy of laser pulse 24 and thus the radiant energy supplied to combustion chamber 14.

Changes to the wavelength of pump light 60 result in different absorption ratios for pump light 60 both in laser-active solid 44 or passive Q-switching system 46 and in optical amplifier 70. This means that the radiant energy absorbed by relevant solid bodies 44, 46, 70 from pump light 60 depends on the wavelength of pump light 60.

While this always varies the pumping duration required for generating a laser pulse in laser-active solid 44 because the behavior over time of the population inversion, and therefore the activation of laser operation, changes due to the varied irradiation or absorption of pump light 60 in laser-active solid 44 or in passive Q-switching system 46, a variation in the population inversion of optical amplifier 70, which occurs as a function of the wavelength of pump light 60, also produces a corresponding, variable amplification of a laser pulse 24 passing through optical amplifier 70.

This means that varying the wavelength of pump light 60 does not affect laser pulses generated by laser oscillator 42, 44, 46, 48 or its energy. However, a variation of the wavelength of pump light 60, which is also used to pump optical amplifier 70, affects the degree of the population inversion in optical amplifier 70 and thus also the energy available for amplifying a laser pulse passing therein.

This process is explained in greater detail below with reference to FIG. 3.

Figure 3:
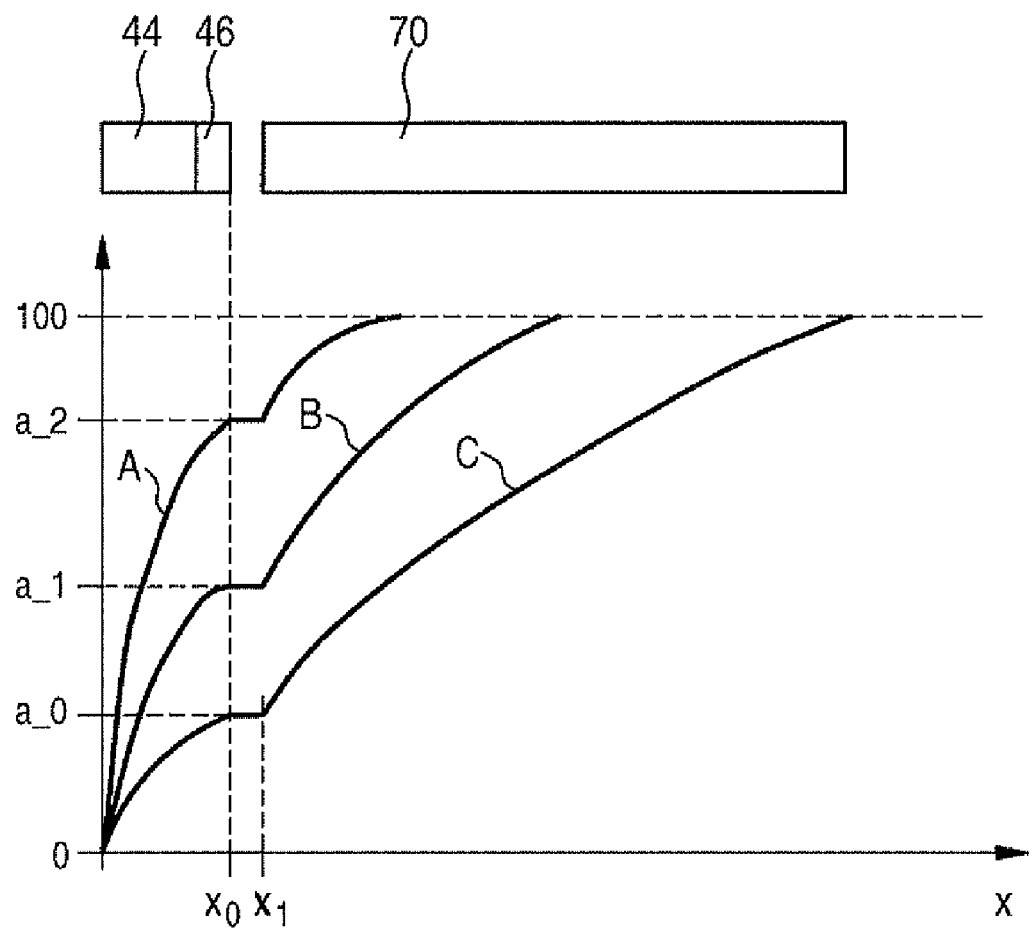
FIG. 3 shows a diagram which schematically depicts the curve of an absorption of pump light within a laser-active solid and the curve of an optical amplifier of the ignition device according to an example embodiment of the present invention over the length thereof.

At a first wavelength of pump light 60, for example, the absorption curve identified by reference letter A in FIG. 3 is obtained which represents a relative absorption of pump light 60 over a position coordinate x, measured in the radiation direction of pump light 60. For example, the radiation direction of pump light 60 runs from left to right in FIG. 2, i.e., pump light 60 first penetrates laser-active solid 44 and then penetrates passive Q-switching system 46 and finally penetrates optical amplifier 70.

Laser-active solid 44, passive Q-switching system 46 and downstream optical amplifier 70 are also illustrated schematically above the absorption diagram in FIG. 3, a gap being provided, however, between passive Q-switching system 46 and optical amplifier 70, i.e., between position coordinates x0, x1 for the purpose of better clarity, in contrast to the configuration according to FIG. 2.

As shown in FIG. 3, the relative absorption of pump light 60 according to curve A at a first wavelength in components 44, 46 is approximately 80%, which is represented by value a_2. Accordingly, only approximately 20% remains for the relative absorption of pump light 60 in downstream optical amplifier 70. In this case, optical amplifier 70 will therefore be able to carry out only a relatively small amplification of laser pulse 24.

Curve B, which is also illustrated in FIG. 3, is obtained at a second wavelength set for pump light 60. In this case, an absorption behavior which is completely different compared to curve A is obtained, so that a relative absorption of only approximately 50% of the pump light energy occurs in components 44, 46, identified by value a_1. This means that, at this second wavelength of pump light 60, approximately 50% of the pump light energy irradiated into laser device 26 remains for pumping optical amplifier 70, so that a substantially greater amplification by optical amplifier 70 is achievable, compared to the situation according to curve A. Pumping via pump light 60 at the second wavelength therefore makes it possible to generate a laser pulse 24 having more energy than is the case when using the first wavelength for pump light 60.

In the further curve C illustrated in FIG. 3, the wavelength of pump light 60 is selected in such a way that the relative absorption of pump light 60 in components 44, 46 is only approximately 25% (see value a_0). In this case, approximately 75% of the pump light energy remains for pumping optical amplifier 70, which is able to amplify a laser pulse passing through it to a correspondingly large extent.

On the whole, the selection of different wavelengths for pump light 60 ensures a presettable distribution of pump light energy to components 44, 46, on the one hand, and optical amplifier 70, on the other hand. Due to the relatively easy-to-implement variation of the wavelength of pump light 60, it is therefore possible to also set the amplification of optical amplifier 70 and thus ultimately the energy of a laser pulse 24. In the case of a pump light source 30 designed as a semiconductor laser diode, the wavelength of pump light 60 may be advantageously varied, for example by setting a temperature of the semiconductor laser diode.

In particular, it is advantageous that only a single pump light source 30 is required, using the method according to the present invention, to be able to generate laser pulses 24 having variable energy.

In an example embodiment of the present invention, with regard to pump light source 30 or optical waveguide device 28, optical amplifier 70 is situated downstream from laser-active solid 44 or its passive Q-switching system 46 such that optical amplifier 70 is preferably supplied only by such a pump light of pump light source 30 which passes through laser-active solid 44 and/or passive Q-switching system 46. In this case, it is ensured that a particularly efficient utilization of pump light 60 takes place.

The length of laser-active solid 44 and/or passive Q-switching system 46 along a radiation direction x (FIG. 3) of pump light 60 is advantageously selected such that pump light 60 is not fully absorbed already in laser-active solid 44 and/or passive Q-switching system 46 for at least a portion of the utilized wavelengths of pump light 60, thereby enabling at least a portion of pump light 60 to reach optical amplifier 70 and result in the buildup of a population inversion therein.

Due to the consecutive arrangement of components 44, 46, 70 with regard to the pump light source or input coupling objective 40, a very compact configuration is provided, on the one hand, and, on the other hand, a maximum utilization of pump light 60 in laser-active solid 44 advantageously results in the rapid generation of a laser pulse.

An example embodiment of the method according to the present invention is characterized in that laser pulses 24 having the maximum possible energy are generated, preferably periodically, to clean a combustion chamber window of laser device 26.

In particular, however, the laser pulses having the maximum possible energy are advantageously generated only if an ignitable air/fuel mixture provided for a future operating cycle is not present in combustion chamber 14, so that unintentional ignition is avoided.

Due to the operating method, it is also very advantageous to set the energy of laser pulse 24 as a function of an operating state, in particular of an operating point of internal combustion engine 10. In doing this, for example the minimum ignition energy required for igniting the air/fuel mixture may always be provided, thereby enabling an energy-efficient operation of ignition device 27. A further advantage thereof lies in the fact that high levels of radiant power of laser pulses 24 are not unnecessarily applied to the combustion chamber window of laser device 26, which has an advantageous effect on the life of the combustion chamber window.

To take into account the different latency times between the point at which pump light 60 starts acting upon laser-active solid 44 and a laser operation begins or laser pulse 24 is generated by the use of pump light 60 of varying wavelengths, the radiant power emitted by pumped light source 30 may be varied as needed. For example, a relatively high radiant power of pump light source 30 may be set at a first wavelength of pump light 60 at which the absorption of pump light 60 in components 44, 46 is relatively low (see curve C from FIG. 3), for the purpose of exciting a laser operation in a relatively short period of time, despite the low absorption of pump light 60 in components 44, 46. At a second wavelength of pump light 60, for which an elevated absorption of pump light 60 in components 44, 46 results, the radiant power of pump light 60 may be reduced accordingly to achieve a comparable latency time.

The principle hereof is also applicable to laser devices having more than one pump light source. It may also be advantageously used in steady-state engines.

What is claimed is:

1. A method for operating an ignition device for an internal combustion engine having a laser device that includes a laser-active solid having a passive Q-switching system and an optical amplifier connected downstream from the passive Q-switching system, comprising:
    generating, by the laser device, a laser pulse for radiating into a combustion chamber;
    providing a pump light, by a pump light source of the ignition device, for the laser-active solid and the optical amplifier of the laser device; and
    controlling energy of the laser pulse by varying a wavelength of the pump light.

2. The method according to claim 1, wherein the internal combustion engine is arranged as an internal combustion engine of a motor vehicle.

3. The method according to claim 1, wherein the optical amplifier is supplied only by such a pump light of the pump light source which passes through at least one of (a) the laser-active solid and (b) the passive Q-switching system.

4. The method according to claim 1, wherein a semiconductor laser diode is used as the pump light source, and the wavelength of the pump light is varied by setting a temperature of the semiconductor laser diode.

5. The method according to claim 1, wherein laser pulses having a maximum possible energy are at least one of (a) generated and (b) generated periodically to clean a combustion chamber window of the laser device.

6. The method according to claim 5, wherein the laser pulses having the maximum possible energy are generated only if an ignitable air/fuel mixture provided for a future operating cycle is not present in the combustion chamber.

7. The method according to claim 1, wherein an energy of the laser pulse is set as a function of an operating state of the internal combustion engine.

8. An ignition device for an internal combustion engine, comprising:
    a laser device that includes a laser-active solid having a passive Q-switching system;
    an optical amplifier connected downstream from the passive Q-switching system;
    wherein the laser device is adapted to generate a laser pulse for radiating into a combustion chamber, the ignition device having a pump light source adapted to provide a pump light for the laser-active solid and the optical amplifier of the laser device, an energy of the laser pulse controllable by varying a wavelength of the pump light.

9. The device according to claim 8, wherein the internal combustion engine is arranged as an internal combustion engine of a motor vehicle.

10. The device according to claim 8, wherein, with regard to the pump light source, the optical amplifier is situated downstream from at least one of (a) the laser-active solid and (b) the passive Q-switching system such that it is supplied only by such a pump light of the pump light source which passes through at least one of (a) the laser-active solid and (b) the passive Q-switching system.

11. The device according to claim 10, wherein a length of at least one of (a) the laser-active solid and (b) the passive Q-switching system along a radiation direction of the pump light is selected such that the pump light is not fully absorbed already in at least one of (a) the laser-active solid and (b) the passive Q-switching system for at least a portion of utilized wavelengths of the pump light.

* * * * *